US010074359B2

(12) United States Patent
Silveira Ocampo

(10) Patent No.: US 10,074,359 B2
(45) Date of Patent: Sep. 11, 2018

(54) DYNAMIC TEXT-TO-SPEECH PROVISIONING

(71) Applicant: Google LLC, Mountain View, CA (US)

(72) Inventor: Juan José Silveira Ocampo, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/340,319

(22) Filed: Nov. 1, 2016

(65) Prior Publication Data
US 2018/0122361 A1 May 3, 2018

(51) Int. Cl.
G10L 13/08 (2013.01)
G10L 13/033 (2013.01)
G10L 15/02 (2006.01)
G10L 15/22 (2006.01)

(52) U.S. Cl.
CPC .......... *G10L 13/0335* (2013.01); *G10L 15/02* (2013.01); *G10L 15/22* (2013.01)

(58) Field of Classification Search
CPC ................. G10L 21/0208; G10L 21/2516
USPC .............. 740/260, 207, 205, 226, 233, 270
See application file for complete search history.

(56) References Cited

U.S. PATENT DOCUMENTS

2004/0075677 A1* 4/2004 Loyall ............... G06F 3/011
715/706
2005/0060158 A1 3/2005 Endo et al.
2005/0144002 A1 6/2005 PS
2005/0223328 A1* 10/2005 Ashtekar ............ H04N 21/235
715/706
2006/0025897 A1* 2/2006 Shostak ............ B60C 23/005
701/1
2006/0085183 A1 4/2006 Jain
2006/0122834 A1* 6/2006 Bennett ............ G10L 15/1822
704/256
2006/0149402 A1* 7/2006 Chung ................ H04S 7/307
700/94

(Continued)

FOREIGN PATENT DOCUMENTS

DE 102016103160 9/2016
WO WO 20150092943 6/2015

OTHER PUBLICATIONS

International Search Report and Written Opinion issued in International Application No. PCT/US2017/041960, dated Oct. 18, 2017, 14 pages.

*Primary Examiner* — Jakieda Jackson
(74) *Attorney, Agent, or Firm* — Fish & Richardson P.C.

(57) ABSTRACT

A dynamic text-to-speech (TTS) process and system are described. In response to receiving a command to provide information to a user, a device retrieves information and determines user and environment attributes including: (i) a distance between the device and the user when the user uttered the query; and (ii) voice features of the user. Based on the user and environment attributes, the device determines a likely mood of the user, and a likely environment in which the user and user device are located in. An audio output template matching the likely mood and voice features of the user is selected. The audio output template is also compatible with the environment in which the user and device are located. The retrieved information is converted into an audio signal using the selected audio output template and output by the device.

18 Claims, 5 Drawing Sheets

(56) References Cited

U.S. PATENT DOCUMENTS

| | | | |
|---|---|---|---|
| 2008/0269958 A1* | 10/2008 | Filev | B60W 50/10 701/1 |
| 2010/0083320 A1* | 4/2010 | Roberts | H04N 7/17318 725/61 |
| 2010/0250231 A1* | 9/2010 | Almagro | G06F 17/289 704/2 |
| 2011/0193726 A1* | 8/2011 | Szwabowski | B60R 16/0373 340/996 |
| 2012/0059787 A1* | 3/2012 | Brown | G06F 17/241 706/52 |
| 2014/0114655 A1* | 4/2014 | Kalinli-Akbacak | G10L 25/63 704/231 |
| 2014/0122081 A1 | 5/2014 | Kaszczuk et al. | |
| 2014/0219485 A1* | 8/2014 | Jensen | H04R 25/405 381/313 |
| 2015/0016633 A1* | 1/2015 | Gao | H03G 3/20 381/107 |
| 2015/0046164 A1* | 2/2015 | Maganti | G10L 13/04 704/260 |
| 2015/0179186 A1* | 6/2015 | Swierk | G06F 3/167 704/276 |
| 2015/0242391 A1* | 8/2015 | Goel | G06F 17/2785 704/9 |
| 2015/0287421 A1* | 10/2015 | Benway | H04K 3/43 704/226 |
| 2015/0325233 A1 | 11/2015 | Bao et al. | |
| 2016/0118036 A1* | 4/2016 | Cheatham, III | G10K 11/178 380/252 |
| 2016/0197764 A1* | 7/2016 | Salinger | H04L 12/2801 370/401 |
| 2017/0160813 A1* | 6/2017 | Divakaran | G06F 3/017 |
| 2017/0358301 A1 | 12/2017 | Raitio et al. | |

* cited by examiner

DYNAMIC TEXT-TO-SPEECH PROVISIONING

FIELD

This disclosure generally relates to speech synthesis.

BACKGROUND

Text-to-speech (TTS) functionality is increasingly used by devices to provide audio output. However, TTS output is generally not automatically adaptable to user circumstances, and only a few limited methods, such as controlling the volume of a device, are available to control TTS output.

SUMMARY

According to some implementations, a TTS operation executed on a user device may automatically control and modify an audio output based on multiple factors including the user's voice, the user's likely mood, and the environment in which the user device is located in. For example, in some implementations, a user device may receive a command to provide information to a user. In response to receiving the command, the user device retrieves the information pertinent to the command and may determine user and environmental attributes including: (i) a proximity indicator indicative of a distance between the user device and the user; (ii) voice features, such as tone or pitch, of the user; and (iii) environmental noise. The user device may also determine the application through which the retrieved information is to be output. The user device selects an audio output template that matches the user and environmental attributes and is compatible with the environment in which the user and user device are located in. The retrieved information is converted into an audio signal that conforms to the selected audio output template and is output by the user device. Privacy and security policies may be implemented such that the user device can maintain user privacy and not output information to third parties or respond to third party commands.

According to some implementations, the audio signal output by the user device may be generated dynamically to mimic features of a user's voice or mood by, for example, matching the tone or pitch in which the user speaks or by enunciating certain words or syllables to match the user's voice or mood. In some implementations, the user device may determine how far the user is from the user device and adjust a volume or intensity of the audio output signal accordingly. In some implementations, the user device may determine the type of environment the user is in and adjust the audio output signal according to the determined environment type. For example, the user device may determine that the user is in a crowded environment and may increase a volume of the audio output signal so that the user may hear the audio output signal in spite of being in a crowded environment. In another example, the user device may determine that the user is in a crowded environment, and may request permission from the user to output the audio signal so that information that the user may not want to disclose to a third party remains private.

Innovative aspects of the subject matter described in this specification include, in some implementations, a computer-implemented method to perform operations. The operations include determining, by one or more computing devices, one or more user attributes based on one or more of: (i) a voice feature of a user associated with a user device, and (ii) a proximity indicator indicative of a distance between the user and the user device. The operations also include obtaining, by the one or more computing devices, data to be output. The operations also include selecting, by the one or more computing devices, an audio output template based on the one or more user attributes. The operations also include generating, by the one or more computing devices, an audio signal including the data using the selected audio output template. The operations also include providing, by the one or more computing devices, the audio signal for output.

Implementations may each optionally include one or more of the following features. For instance, in some implementations, the voice feature of the user associated with the user device includes one or more of a pitch, tone, frequency, and amplitude in an audio voice signal associated with the user.

In some implementations, the operations include determining environment attributes and determining a type of environment based on the determined environment attributes. The audio output template is selected based on the determined type of environment.

In some implementations, the selected audio output template includes amplitude, frequency, word enunciation, and tone data for configuring the audio signal for output. The selected audio output template includes attributes that match the determined one or more user attributes.

In some implementations, the operation of selecting the audio output template includes selecting the audio output template based on one or more of: (I) a type of the data to be output, and (II) a type of application used to provide the data to be output.

In some implementations, the operations include receiving a command to output data. The command includes a user request to obtain data or an instruction from an application programmed to output data at a particular time.

In some implementations, the operation of determining the one or more user attributes based on the proximity indicator indicative of the distance between the user and the user device includes obtaining audio signal data from a first microphone, obtaining audio signal data from a second microphone, obtaining sensor data from one or more sensors, and determining a likely location and a likely distance of the user based on the sensor data, audio signal data from the first microphone, and the audio signal data from the second microphone.

In some implementations, the operations include receiving an audio voice signal from the user. The audio signal provided for output has a pitch, tone, or amplitude that matches the received audio voice signal.

Other implementations of these aspects include corresponding systems, apparatus, computer-readable storage mediums, and computer programs configured to implement the actions of the above-noted methods.

The details of one or more implementations are set forth in the accompanying drawings and the description below. Other features and advantages will become apparent from the description, the drawings, and the claims.

BRIEF DESCRIPTION OF THE DRAWINGS

Like reference numbers and designation in the various drawings indicate like elements.

DETAILED DESCRIPTION

Exemplary implementations are described with reference to the figures.

Figure 1A:
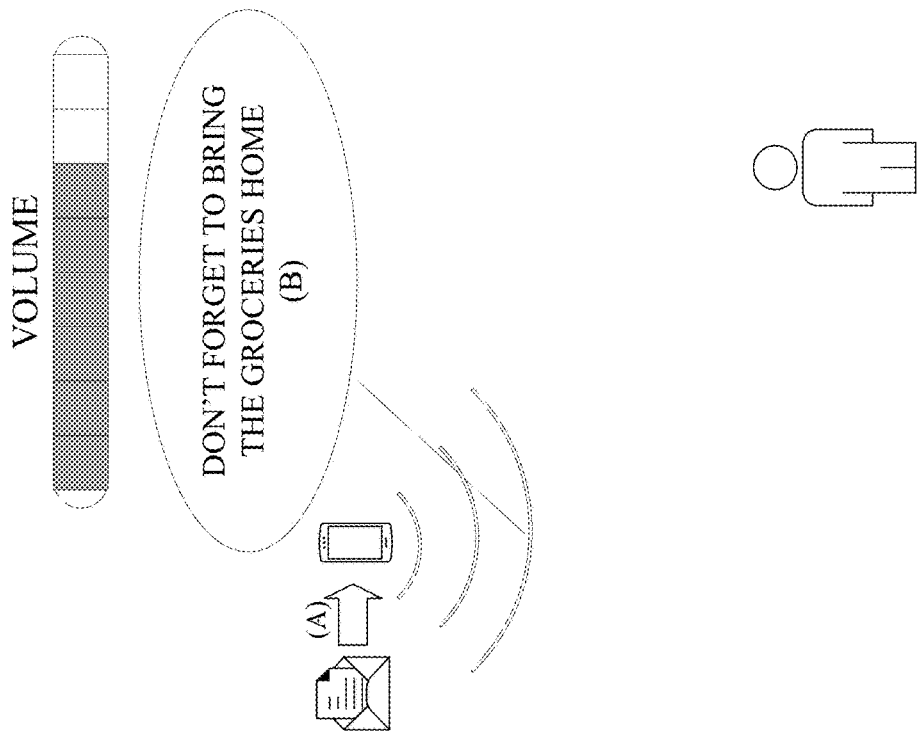
FIGS. 1A and 1B depict exemplary scenarios of providing TTS outputs.

In the exemplary scenario illustrated in FIG. 1A, a user device may be located a short distance away from the user. When a message, such as a short message service (SMS) message or a multimedia messaging service (MMS) message, is received by the user device (A), the user device may determine that a messaging application is used to output message contents and that the messaging application is configured for TTS output.

The user device may then utilize data obtained by sensors and microphones to determine user and environmental attributes. For example, as discussed in more detail below, the user device may actuate the microphones and sensors to monitor the user's voice, detect environmental conditions, and to determine a proximity indicator indicative of the user's distance from the user device. Based on the data received from the sensors and microphones, the proximity indicator determined by the user device may indicate that the user is likely within, for example, 12 inches of the user device. The user device may also determine that the environment in which the user and user device are located in is not a noisy environment.

The user device may then convert the content in the received message to an audio signal and control the output of the audio signal to be at a volume proportional to the determined proximity indicator. As shown in FIG. 1A, the user device may output the audio signal at a relatively low volume because the proximity indicator indicates that the user is likely to be approximately 12 inches from the user device and because the environment around the user device is likely not a noisy environment. For example, the user device outputs content of the received message "DON'T FORGET TO BRING THE GROCERIES HOME" using an audio signal at a volume that is one quarter of the maximum volume level of the user device (B).

Figure 1B:
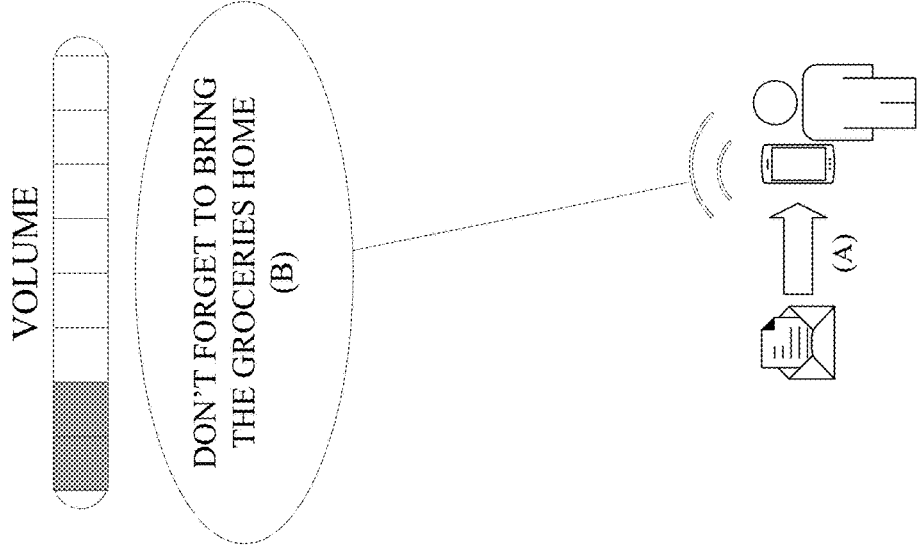

In the exemplary scenario illustrated in FIG. 1B, the user device may be located further away from the user compared to the scenario illustrated in FIG. 1A. The user and user device may be separated, for example, by 8 feet. When a message, such as a short message service (SMS) message or a multimedia messaging service (MMS) message, is received by the user device (A), the user device may determine that a messaging application is used to output message contents and that the messaging application is configured for TTS output.

The user device may then actuate microphones and sensors to determine user and environmental attributes. Based on the data received from the sensors and microphones, the proximity indicator determined by the user device may indicate that the user is likely within, for example, 8 feet of the user device. The user device may then convert the content in the received message to an audio signal and control the output of the audio signal to be at a volume proportional to the proximity indicator.

Referring to FIG. 1B, because the proximity indicator indicates that the user likely to be approximately 8 feet from the user device, the user device may output the audio signal at relatively high volume. For example, the user device outputs the received message "DON'T FORGET TO BRING THE GROCERIES HOME" using an audio signal at a volume that is three quarters of the maximum volume level of the user device (B).

The above-described automatic and dynamic method of controlling the TTS output is advantageous for several reasons. For example, it would be undesirable to output an audio signal at the same volume when the user is close to a user device and when the user is further away from the user device. By factoring in the user's distance in addition to the environmental attributes, a user can avoid the inconvenience of having to move towards a user device just to listen to a message or to adjust the volume of a user device whenever the user's position relative to the user device changes.

Figure 2A:
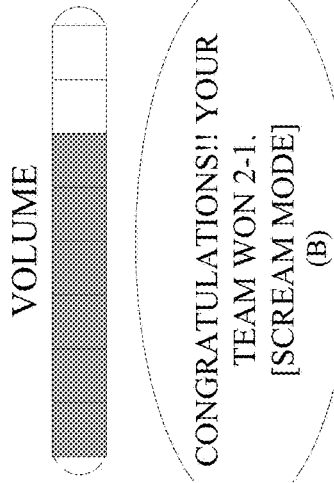
FIGS. 2A and 2B depict exemplary scenarios of providing TTS outputs.
Figure 2A:
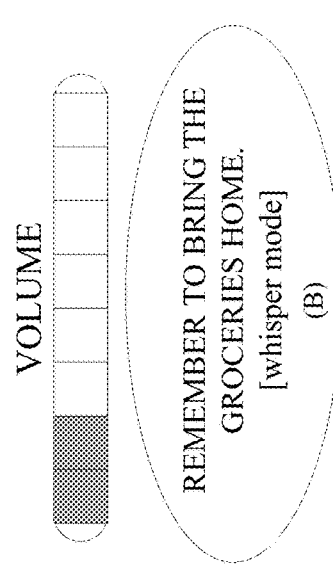

Referring to FIG. 2A, a user device receives a query from a user. The query is whispered by the user. Although the illustrated query is "Can you remind me what's on my to-do list," in general, any query may be submitted.

Upon receiving the query, the user device may determine that the application used to respond to the user query has been configured for TTS output. The user device may then actuate microphones and sensors to determine user and environmental attributes.

From the actuated microphones, the user device may obtain samples of the user's voice. Voice samples may be various-sized portions of a user's query. The voice samples are processed to determine one or more voice features, which may include, but are not limited to, a pitch, tone, frequency, and amplitude of an audio signal corresponding to the user's voice.

The voice samples may also be classified to determine user characteristics such as the user's likely mood or oratory style. For instance, a voice sample may be classified as indicating that a user is likely to be happy, excited, sad, or anxious. The voice sample classification may also indicate voice signatures that are unique to a user, such as user enunciation of certain words, such as, for example, "me" or "remind." Data indicative of the voice features and classification may be added as user attributes to a user profile stored in a user database, and may, in some cases, be used for voice recognition purposes.

The user device then accesses a database of a plurality of audio output templates and selects an audio output template from the plurality of templates that has the highest degree of similarity to the determined user attributes. In some cases, if a suitable audio output template cannot be selected, the user device may create or communicate with a server to create a new template that is based on the determined user attributes.

An audio output template is a template that is used to generate and output an audio signal. The template may include various parameters such as pitch, tone, frequency band, amplitude, user style, and user mood. Values for these parameters may be provided from the determined user attributes and an audio output template having similar properties to the user's voice may thereby be generated.

In FIG. 2A, based on the voice features and classification, the user device determines that the user was likely whispering, and selects a voice output template that corresponds to a whispering audio signal. A voice output template corresponding to a whispering audio signal may include audio signal features such as, for example, a low decibel output, a low volume, and pitch, tone, and frequency corresponding to a whisper.

The user device may obtain data from any suitable source to respond to the user query. In the illustrated scenario, the user device may search the user's to-do or reminder list to respond to the user query. This information may be obtained by communicating with a server in a network or retrieving data stored in a storage device. The storage device may be integrated into the user device or attached to the user device.

After obtaining the data to respond to the query, the user device generates an audio signal that includes the obtained data and conforms with the selected audio output template so that the audio signal may have characteristics that match or resemble the user's attributes. As shown in FIG. 2A, the user device outputs an audio signal to inform the user that bringing the groceries home was on the user's to-do list (B). The user device outputs the audio signal as if the user device were whispering back to the user in response to the user's query. The volume of the user device is set at a relatively low level, for example, one quarter of the maximum volume level, to be consistent a whisper volume.

Figure 2B:
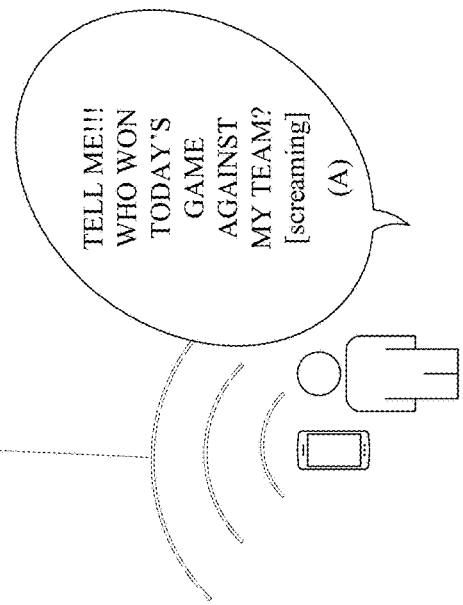
Figure 2B:
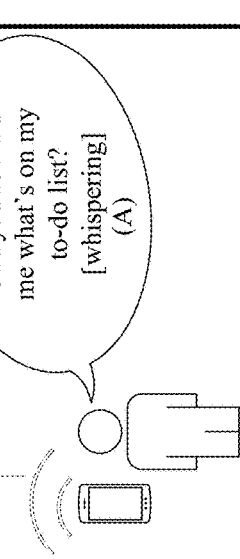

In the illustrated scenario of FIG. 2B, a user may scream with excitement and ask the user device who won a game against the user's favorite team. By determining the user attributes using the process described above with reference to FIG. 2A, the user device may obtain data to respond to the user's query and output an audio signal that responds to the user in a manner that mimics the user's attributes. For instance, the audio signal output by the user device may have a relatively high volume output, for example, three quarters of the maximum volume level, and may have a tone and pitch that resembles an excited person. The audio signal includes information to inform the user that the user's team won 2-1.

Mimicking a user's input query offers several advantages. For example, the user may be in an environment where the user cannot speak loudly and has to whisper. In such an environment, the user may likely want to avoid a high volume response to avoid potential embarrassment or inconveniencing other people surrounding the user. Accordingly, as a result of using the dynamic TTS provisioning method, the user can avoid such a potentially embarrassing scenario by receiving a low volume response, and the user does not have to modify the audio settings of the user's device. In addition, user experience may be enhanced if the user interacts with a user device that reflects the user's mood. For instance, an excited user will not have to receive a monotonous or dull response to a query.

Figure 3:
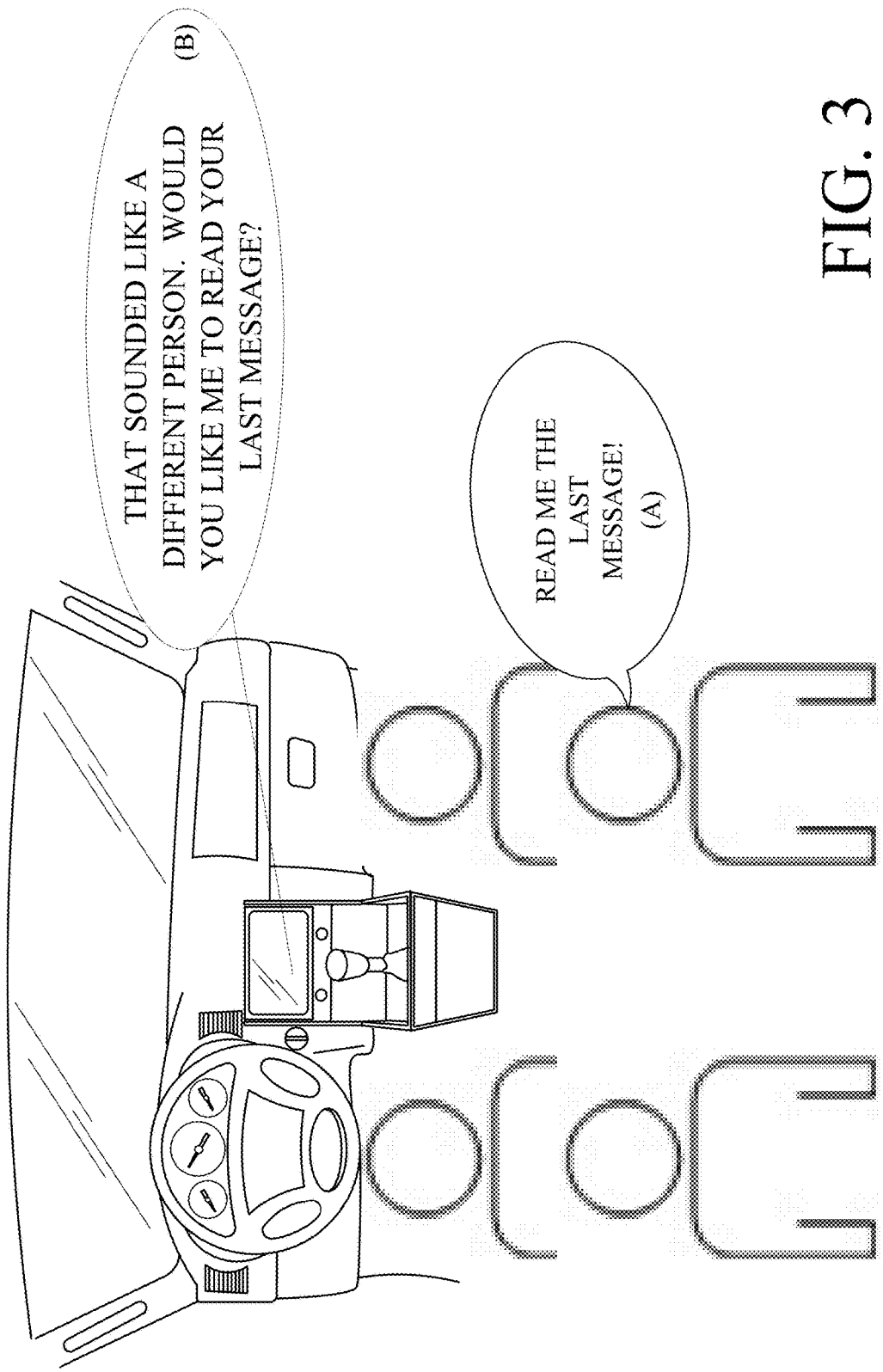
FIG. 3 depicts exemplary scenarios of providing TTS outputs.

FIG. 3 depicts a scenario in which security and privacy features of the TTS provisioning method are implemented. In FIG. 3, the user is the driver of the vehicle, and multiple passengers are seated in the vehicle along with the user. The vehicle includes a vehicle control module that receives multiple signals from vehicle sensors, and executes operations according to vehicle manufacturer and driver configurations. For instance, the vehicle control module may execute the dynamic TTS provisioning method described herein. To communicate with the driver, the vehicle may output audio signals through speakers or display messages through a display device.

Among the security and privacy features integrated into the TTS provisioning method are voice recognition and environment detection features. The vehicle control module receives samples of the user's voice, processes the voice samples, and stores data for voice recognition purposes. For example, the vehicle control module may process a user's voice sample to detect pitch, tone, frequency, and enunciations of the user and store these voice features as user attributes in a user profile. When a subsequent audio instruction is received by the user device, the user device may determine whether the received audio instruction has been issued by the user by comparing voice features of the audio instruction with stored voice features associated with the user.

If the voice features of the subsequent audio instruction and the stored voice features associated with the user match, the vehicle control module may determine that the subsequent audio instruction is likely an instruction of the user. The vehicle control module may then process the audio instruction and execute corresponding operations. For example, if the audio instruction is to increase the volume, the vehicle control module may send a control signal to the speaker to increase the volume.

If the voice features of the subsequent audio instruction do not match the stored voice features associated with the user, the vehicle control module determines that the subsequent audio instruction may not be an instruction of the user. For example, as illustrated in FIG. 3, a passenger in the vehicle may attempt to ask the vehicle control module to read out the driver's personal messages by commanding the vehicle control module to "READ ME THE LAST MESSAGE" (A). The vehicle control module processes the received command and determines that the voice features of the command and the stored voice features associated with the user do not match.

In some implementations, if the voice features of the received command and the stored voice features associated with the user do not match, the vehicle control module may generate an audio signal indicating that the voice in the command did not match the user's voice, and may ask the user to confirm whether or not the instruction in the received command should be performed. For example, as illustrated, the vehicle control module may generate a message "THAT SOUNDED LIKE A DIFFERENT PERSON. WOULD YOU LIKE ME TO READ YOUR LAST MESSAGE?", and output the message through a display device in the vehicle or a speaker in the vehicle. The user may then respond with a confirmation or a rejection.

In some implementations, if the voice features of the subsequent audio instruction do not match the stored voice features associated with the user, the vehicle control module may take no further action and may ignore the received command.

The TTS provisioning method may include additional security features. For example, in some implementations, if a received voice command is not recognized as a user's command, the TTS provisioning method may not execute certain features, such as mimicking the tone and pitch of the received voice command. This feature would avoid various undesirable scenarios, for example, other users screaming into a user device merely to have the user device output an audio signal in a loud volume.

Figure 4:
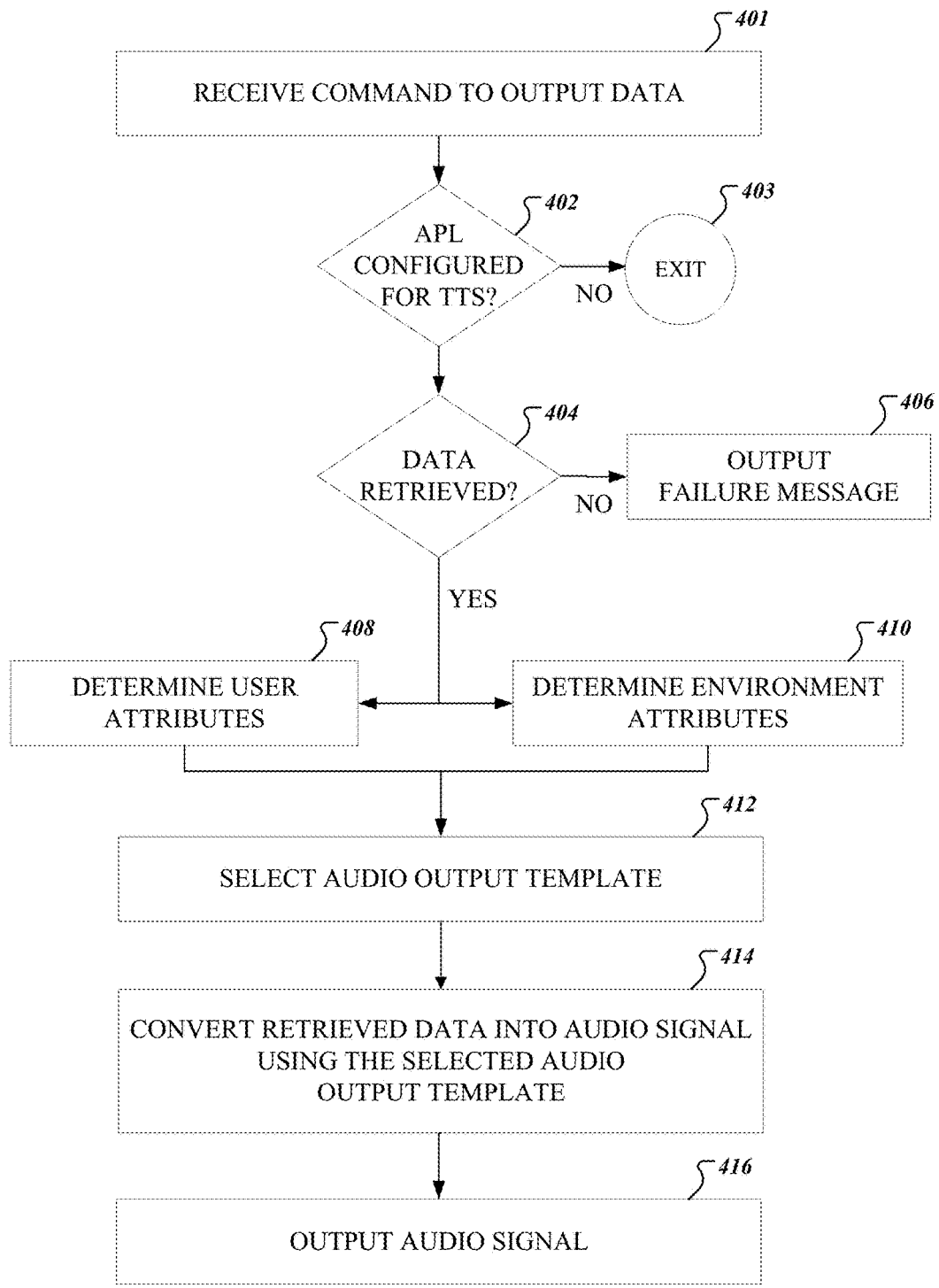
FIG. 4 depicts a flowchart illustrating a method for providing a TTS output.

FIG. 4 depicts a flowchart illustrating a method for providing a dynamic TTS output. The method may be executed by the system illustrated in FIG. 5. The system may be implemented in a user device or in a distributed manner across one or more networks that include the user device. The system includes a transceiver 502, one or more sensors 504, one or more microphones 506, a processor 510, a speech synthesizer 520, and a speaker 530. The processor 510 includes an application determiner 512 and a plurality of classifiers including a proximity classifier 514, a voice classifier 516, and an environment classifier 518. The speech synthesizer 520 may be a processor that includes a mood classifier 522, an audio signal generator 526, and an audio template selector 528.

The user device may be any suitable electronic device including, but not limited to, a computer, lap top, personal digital assistant, electronic pad, electronic notebook, telephone, smart phone, television, smart television, a watch, navigation device, or, in general, any electronic device that can connect to a network and has a speaker. The user device may be any combination of hardware and software and may execute any suitable operating system such as an Android® operating system.

A user may configure the user device to output data for particular applications in an audio format using the dynamic TTS provisioning method described herein. For example, a user device may be configured to utilize a TTS function and output an audio signal for one application but not for another application. An audio signal output by the user device may include data obtained by an application from a network, or data generated or stored by the user device. Examples of data that may be output include, but are not limited to, content received in a text message, application push messages, data scheduled for output by alarm or scheduling applications, content obtained by web browsing applications, text-based content stored in the user device, and, in general, any data that can be output in an audio format.

The method for providing dynamic TTS output may begin when a command to output data is received (401). The command may be received in various suitable ways. In some cases, the command may be a user command received through a microphone 506. In some cases, the command may be generated in response to execution of code by an application, server, or processor. For example, a scheduling application may be configured to output a reminder message at a particular time using TTS. As another example, a text message may be received and may trigger a command to output the received text message.

After receiving the command, the application determiner 512 may determine which application to use to process or respond to the command and whether the determined application is configured for TTS output (402). In general, commands may be classified and mapped to a particular application. The application determiner 512 accesses the mapping information to determine which application to use to process or respond to the command. For example, if a command to output an electronic or text message is received, the command is classified as a text messaging output command and is mapped to a messaging application that may be used to output the received message. In another example, a command corresponding to a user query may be classified as a knowledge query and mapped to a browser application. The browser application may be used to respond to the query with data retrieved from a network, such as the Internet.

The mapping of commands to applications may be completed by a manufacturer of a user device, a program writer, or the user. In some cases, the user may specify using a particular application for responding to a particular command. For example, the user may select one of several browsers as a default for responding to knowledge queries.

After accessing a mapping of the commands and selecting an application to process or respond to a command, the application determiner 512 determines whether the selected application is configured to TTS output. For example, the application determiner 512 may verify whether the selected application is configured for TTS output. In some cases, the application determiner 512 may determine whether one or more conditions are satisfied to trigger the selected application to provide TTS output. For example, based on data provided by one or more sensors 504 such as gyroscopes, microwave sensors, ultrasonic sensors, if the system determines that the user device is moving at a speed corresponding to a running movement or movement in a car, the system may determine that data is to be output to the user in an audio format using dynamic TTS provisioning to enhance user safety. The system may then configure applications used by the user device to execute TTS to provide data in an audio format as long as the moving conditions persist.

If the selected application is not configured to use TTS functionality to output data, the system may respond to the command through other methods not illustrated in FIG. 4 (403). For example, in some cases, a response to the command may be generated without using TTS output.

In some implementations, the system may obtain data that would enable the TTS functionality for the selected application, and ask the user if the user would like to download the data that would enable TTS functionality. If the user agrees to download the data, the system may then download and execute the data to install TTS functionality for the selected application, and execute operation 404 described below. If the user does not agree to download the data, the system cannot utilize the selected application for TTS outputs and may respond to the command through other methods not illustrated in FIG. 4 (403).

If the selected application is configured to use TTS functionality to output data, the system attempts to retrieve data for processing or responding to the command (404). The data may be retrieved in various suitable ways including, for example, communicating with a network, such as the Internet, to retrieve data, or communicating with a server, database, or storage device to retrieve data. The source from where data is obtained from depends on various factors including the type of application and type of command. For example, in some cases, to process certain commands, an application may be preconfigured to retrieve data from an application database or application server. In contrast, another application may have more flexibility and may retrieve data from various suitable data sources in response to the same command. The system may use transceiver 502 to communicate with any module or device not included in the system of FIG. 5.

If the system cannot retrieve data to process or respond to the command, the system outputs a failure message indicating that the system is unable to respond to the command (406). If the system successfully retrieves data, the system determines user attributes (408) and environment attributes (410).

To determine user attributes, the system may utilize one or more sensors 504 and one or more microphones 506. The sensors 504 may include various suitable sensors including, but not limited to, touch sensors, capacitive sensors, optical sensors, and motion sensors. Data received from the sensors 504 may be used to provide various types of information. For example, touch, optical, or capacitive sensors may be used to determine whether a user is touching the user device or is in close proximity of the user device. The motion sensors may be used to determine a direction, displacement, or velocity of the user device's movement. The optical sensors may be used to determine the lighting conditions around the user device.

The one or more microphones 506 may be used to receive an audio signal from the user or any person uttering a command to the user device. In some cases, multiple microphones 506 may be integrated with the user device. The multiple microphones 506 may each receive an audio signal. The audio signal from each microphone can be processed to determine a proximity indicator indicating a distance of the user from the user device.

For example, the system may have two microphones. One microphone is placed on one side, for example the left side, of the user device and the other microphone is placed on another side, for example the right side, of the user device. When a user speaks, both microphones may respectively receive audio signals. If the audio signal received through the microphone on one side, for example the left side, of the user device has a greater amplitude than the audio signal received through the microphone on the other side, for example the right side, of the user device, the proximity classifier 514 may determine that the user or the user's mouth is likely closer the left side of the user device. If the audio signal received through the microphone on the right side of the user device has a greater amplitude than the audio signal received through the microphone on the left side of the user device, the proximity classifier 514 may determine that the user's mouth is likely closer to the right side of the user device.

In some cases, if the audio signal detected at the microphone on one side, for example the left side, of the user device is received before the audio signal detected at the microphone on the other side, for example the right side, of the user device, the proximity classifier 514 may determine that the user or the user's mouth is likely closer the left side of the user device. If the audio signal detected at the microphone on the right side of the user device is received before the audio signal detected at the microphone on the left side of the user device, the proximity classifier 514 may be determined as likely being located closer to the right side of the user device. If the time difference of the signals received at both microphones is large, the user may be determined as likely being located further away from the microphone that received an audio signal later in time and closer to the microphone that received an audio signal earlier in time.

In some implementations, if the audio signals received by the multiple microphones have similar characteristics, for example, similar amplitudes and frequencies, the proximity classifier 514 may determine that the user is likely located at a distance greater than a particular threshold distance from the device. If the audio signals received by the multiple microphones have different characteristics, the proximity classifier 514 may determine that the user is likely located at a distance less than a particular threshold distance from the device.

In some implementations, a sliding scale may be used along with the signals received by the one or more microphones 506 to calculate the proximity indicator. For instance, if the audio signals received by the multiple microphones have the same characteristics, the proximity classifier 514 may calculate a proximity indicator that indicates that the user is located at a distance equal to or greater than a particular distance threshold. The particular distance threshold may be determined based on the type of user device and microphones and may be set by a manufacturer of the user device. As the differences between the audio signals received by the microphones become greater, the proximity classifier 514 may apply a sliding scale and calculate a proximity indicator that indicates that the user is located at a distance less than a particular distance threshold. The calculated distance from the user device may be inversely proportional to the differences in the audio signals and the sliding scale may be applied to calculate the likely distance of the user from the user device.

In addition to the proximity indicator, other user attributes, such as voice features and likely user mood, may be determined. When an audio signal is received by a microphone 506, the audio signal may be processed by the voice classifier 516 to extract data that is used to determine voice features and predict the likely user mood. Voice features may include a pitch, frequency, amplitude, and tone of a user's voice and user enunciation patterns. Likely user moods may include any type of human mood, such as happy, sad, or excited moods.

To determine voice features, an audio signal received from by a microphone 506 may be filtered to remove ambient and environmental noise. For example, a filter having a passband bandwidth that corresponds to the likely range of human voice frequencies, e.g., 80 to 260 Hz, may be used. The filtered audio signal may be processed to extract the amplitude and frequency of the audio signal. The voice classifier 516 may receive the extracted amplitude and frequency data to determine a pitch and tone of the user's voice. A mood classifier 522 may then predict the likely mood of the user based on the pitch, tone, amplitude, and frequency data of the audio signal. By using classifiers to classify audio signals received from a user and determine user attributes, the likely user temperament, such as whether a user is whispering, shouting, happy, sad, or excited, may be determined.

In some implementations, the voice classifier 516 includes a linguistic classifier that may be used to determine intonations and enunciations of words used in a received audio signal. For example, the linguistic classifier may identify words in the received audio signal and determine if certain words are enunciated more than other words in the received audio signal.

The user attributes, including the voice features and likely user mood, may be stored in a database as part of a user voice profile. The user voice profile may be anonymized without any identity information, but may include user attribute data that indicates a voice profile of a default user of the user device. In some implementations, a user may control whether the system can create a user profile or store user attributes by selecting an option to permit the system to create a user profile or store user attributes. In general, user profile and user attribute data is anonymized so that no personally identifiable information can be determined for the user, or a user's geographic location may be generalized where location information is obtained (such as to a city, ZIP code, or state level), so that a particular location of a user cannot be determined.

In some implementations, data extracted from voice signals received by the microphones 506 may be used for accuracy and verification purposes. For example, a user attribute information that is determined based on an audio signal received from one microphone may be compared to user attribute information that is determined based on an audio signal received from another microphone. If the information from the two microphones is the same, the system may have greater confidence in its determination of the user attribute. If the information from the two microphones is different, the user device may have low confidence in its determination of the user attribute. The system may then obtain data from a third microphone for determining user attributes, or may extract and classify additional voice signals received by the two microphones. In some implementations, data extracted from voice signals received by multiple microphones may be averaged, and the average data may be processed to determine user attributes.

To determine environment attributes (410), the environment classifier 518 may process audio signals to classify likely environment features around the user device. For example, in some implementations, amplitude and frequency data may be extracted from received audio signals and voice signals corresponding to the user's voice may be filtered out. The amplitude and frequency data may be used by the environment classifier 518 to classify the received signals as likely including sounds corresponding to particular environments, such as environments in which there is a crowd, beach, restaurant, automobile, or a television set present.

In some implementations, data from the sensors 504 may be used independently or may be used with the audio signal classification to determine environment attributes. For example, if motion sensors determine that the user device is moving at speeds in a particular range, for example, 20 miles per hour of above, the environment classifier 518 may determine that the user device environment likely corresponds to an environment that includes a moving vehicle. In some implementations, environment attribute information determined based on sensor data may be compared with environment attribute information determined based on audio data. If the environment attribute information based on sensor data matches the environment attribute information based on audio data, the environment classifier 518 may have high confidence in its determination of environment attributes. If the environment attribute information based on sensor data does not match the environment attribute information based on audio data, the environment classifier 518 may have low confidence in its determination of environment attributes.

In some implementations, privacy and security policies may be implemented to maintain user privacy and not output information to third parties or respond to third party commands. For example, after determining user attributes, the system may verify if the determined user attributes match the user attributes stored in the user voice profile. If the determined user attributes match the stored user attributes, the system may determine that the audio signal corresponds to a voice of a user of the user device. If the determined user attributes do not match the stored user attributes, the system may determine that the audio signal does not correspond to a voice of the user of user device. The system may then terminate the dynamic TTS provisioning method or may ask the user for permission to respond to the command.

In some implementations, the determined environment attributes are verified to determine whether the system should output audio data in an environment that corresponds to the determined environment attributes. In particular, environments in which audio output is restricted or limited may be listed in a restricted list of environments. If an environment that corresponds to the determined environment attributes is listed in the restricted list of environments, the system may terminate the dynamic TTS provisioning method or may ask the user for permission to respond to the command. For example, if a crowded environment with many different voices is listed as a restricted environment and the determined environment attributes indicate that the user device is in a crowded environment, the system may terminate the dynamic TTS provisioning method or may ask the user for permission to respond to the command.

Referring back to FIG. 4, the determined user attributes and environment attributes may be used by the audio template selector 528 to select an audio template for an audio output signal (412). An audio output template that has features that match the determined user attributes and environmental attributes is selected from a database of audio templates. In some cases, the selected audio output template has an amplitude, frequency, tone, pitch, and enunciations that match an amplitude, frequency, tone, pitch, and enunciations, respectively, in the determined user attributes and environment attributes. In some cases, one or more of an amplitude, frequency, tone, pitch, and enunciations of the selected audio output template may match one or more of an amplitude, frequency, tone, pitch, and enunciations, respectively, in the determined user attributes and environment attributes.

The audio template selector 528 may access a database of audio output templates to select an audio output template from a plurality of audio output templates. In some cases, if a suitable audio output template cannot be selected, the system generates a new template based on the determined user attributes and saves the new template in the database of audio output templates.

In an exemplary scenario such as the scenario illustrated in FIG. 2A, if the user attributes indicate that a user is located close to the user device and that the user uttered a command in a whispering tone, and the environmental attributes indicate that the user is likely in a quiet space or room, the audio template selector 528 in the user device may select an audio output template that has a low output volume and a whispering tone.

In some implementations, the audio output template may be selected based on one or more of the type of content to be output in response to the command and a type of application through which the data is to be output. For example, if the content to be output is a joke, an audio output template that uses a jovial or joking tone may be selected. As another example, if an audio book application is to be used to respond to the command, an audio output template that is configured for the audio book application may be selected. The application to be used to output data in response to the command is determined in operation 402 as described above. In general, the audio output template may be selected by the audio template selector 528 based on any combination of the user attributes, environment attributes, type of content to be output, and type of application through which the data is to be output.

Next, the data retrieved in operation 404 is converted into an audio signal by the audio signal generator 526 using the selected audio output template (414). For example, as shown in FIG. 2A, if the data obtained in response to the user command is "REMEMBER TO BRING THE GROCERIES HOME," this data is converted into an audio signal using an audio output template that is selected based on the user attribute indicative of a user having a whispering tone. The audio signal generator 526 may use any suitable audio synthesizer technique, such as concatenation synthesis, formant synthesis, articulatory synthesis, and hidden Markov model (HMM)-based synthesis, to convert the retrieved data to an audio signal.

Next, the audio signal that includes the obtained data in an audio format is output using one or more speakers 530 (416).

Figure 5:
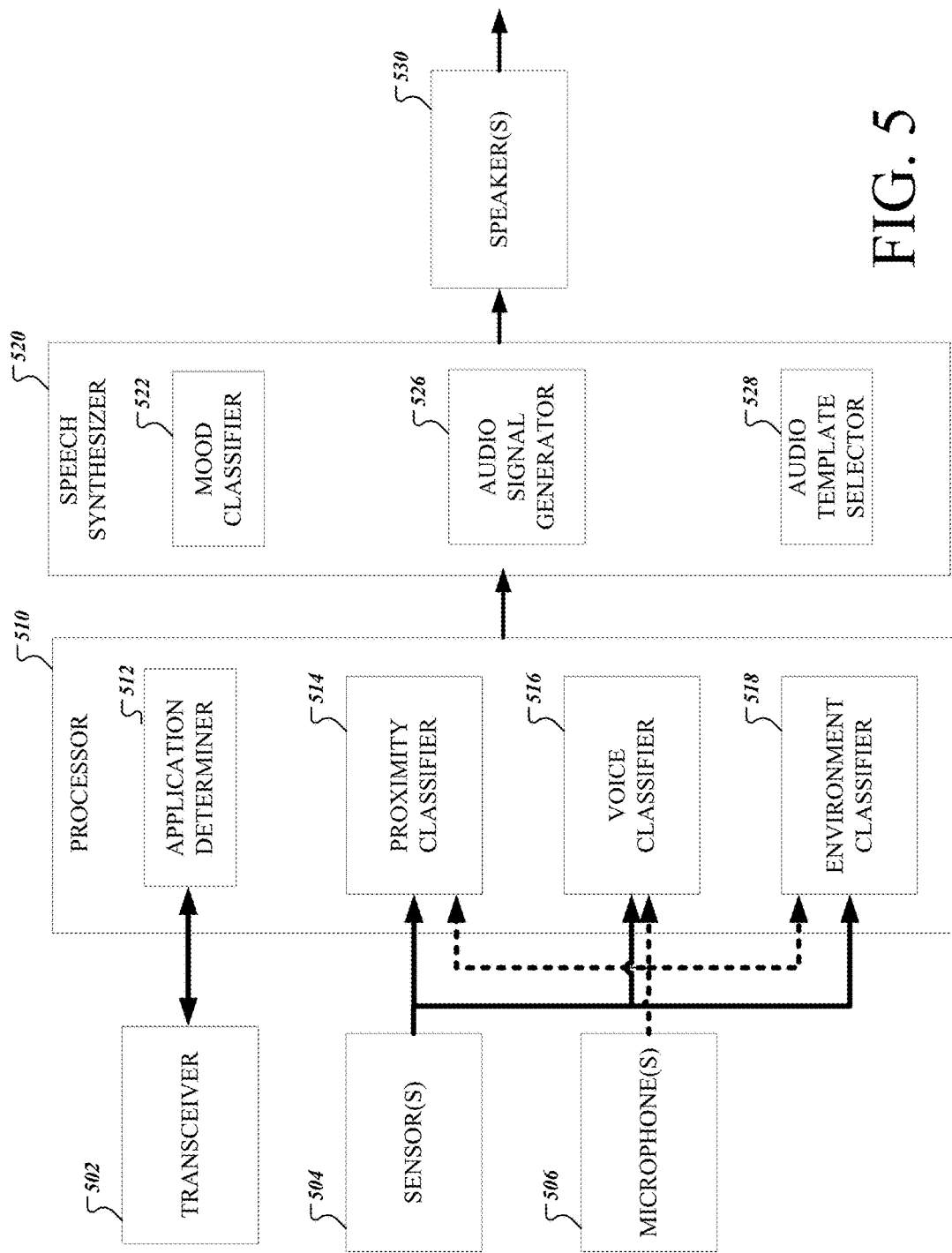
FIG. 5 depicts an exemplary system for providing a TTS output.

The system illustrated in FIG. 5 may be implemented in a user device or in a distributed manner across one or more networks that include the user device.

The transceiver 502 in the system includes a transmitter and a receiver and may be utilized to communicate with one or more network servers, and one or more databases. The transceiver may include amplifiers, modulators, demodulators, antennas, and various other components. The transceiver may direct data received from other network components to other system components such as the processor 510 and speech synthesizer 520. The transceiver 527 may also direct data received from system components to other devices in the one or more networks.

The one or more networks may provide network access, data transport, and other services to the system, one or more network servers, and one or more databases. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VP N), an enterprise IP network, corporate network, or any combination thereof.

In some implementations, the one or more networks may include a cloud system, one or more storage systems, one or more servers, one or more databases, access points, and modules. The one or more networks including the cloud system may provide Internet connectivity and other network-related functions.

The one or more servers may communicate with system to implement one or more operations of the dynamic TTS provisioning method described herein. The one or more servers may include any suitable computing device coupled to the one or more networks, including but not limited to a personal computer, a server computer, a series of server computers, a mini computer, and a mainframe computer, or combinations thereof. For example, the one or more servers may include a web server (or a series of servers) running a network operating system.

The one or more servers may also implement common and standard protocols and libraries, such as the Secure Sockets Layer (SSL) protected file transfer protocol, the Secure Shell File Transfer Protocol (SFTP)-based key management, and the NaCl encryption library. The one or more servers may be used for and/or provide cloud and/or network computing. Although not shown in the figures, the one or more servers may have connections to external systems providing messaging functionality such as e-mail, SMS messaging, text messaging, and other functionalities, such as encryption/decryption services, cyber alerts, etc.

The one or more servers may be connected to or may be integrated with one or more databases. The one or more databases may include a cloud database or a database managed by a database management system (DBMS). In general, a cloud database may operate on platforms such as Python. A DBMS may be implemented as an engine that controls organization, storage, management, and retrieval of data in a database. DBMSs frequently provide the ability to query, backup and replicate, enforce rules, provide security, do computation, perform change and access logging, and automate optimization. A DBMS typically includes a modeling language, data structure, database query language, and transaction mechanism. The modeling language may be used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. A DBMS may also include metadata about the data that is stored.

The one or more databases may include a storage database, which may include one or more mass storage devices such as, for example, magnetic, magneto optical disks, optical disks, EPROM, EEPROM, flash memory devices, and may be implemented as internal hard disks, removable disks, magneto optical disks, CD ROM, or DVD-ROM disks for storing data. In some implementations, the storage database may store one or more of user profiles, rules for classifying received audio signals, rules for selecting audio templates, and training data for training the classifiers in the system.

In general, various machine learning algorithms, neural networks, or rules may be utilized along with training data to train and operate the classifiers in the system. For example, the voice classifier 516 may be trained with training data for identifying voice features such as pitch and tone. The training data may include one or more of a range of frequency and amplitude values and voice samples corresponding to models of particular pitches and tones. The mood classifier 522 may be trained with training data for identifying user moods. Training data for the mood classifier 522 may include values indicating user pitch, tone, ranges of frequency and amplitude values, and samples corresponding to particular user moods.

The proximity classifier 514 may be trained to interpret audio signal data and patterns from one or more microphones and data from sensors to determine the likely location and position of a user relative to the user device. Rules for the proximity classifier 514 may include rules defining distance thresholds and the sliding scale.

The environment classifier 518 may be trained with training data for identifying environmental attributes. The training data may include filter values, one or more of a range of frequency and amplitude values and samples corresponding to models of particular environments.

Embodiments and all of the functional operations and/or actions described in this specification may be implemented in digital electronic circuitry, or in computer software, firmware, or hardware, including the structures disclosed in this specification and their structural equivalents, or in combinations of one or more of them. Embodiments may be implemented as one or more computer program products, for example, one or more modules of computer program instructions encoded on a computer readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to a suitable receiver apparatus.

A computer program, also known as a program, software, software application, script, or code, may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data in a single file dedicated to the program in question, or in multiple coordinated files. A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. A processor may include any suitable combination of hardware and software.

Elements of a computer may include a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. Moreover, a computer may be embedded in another device, for example, a user device. Computer-readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and may even be claimed as such, one or more features from a claimed combination may in some cases be excised from the combination, and the claimed combination may be directed to a sub-combination or variation of a sub-combination.

Similarly, while actions are depicted in the drawings in a particular order, this should not be understood as requiring that such actions be performed in the particular order shown or in sequential order, or that all illustrated actions be performed, to achieve desirable results. Moreover, the separation of various system components in the embodiments described above should not be understood as requiring such separation in all embodiments, and it should be understood that the described program components and systems may generally be integrated together in a single software product or packaged into multiple software products.

It should be understood that the phrase one or more of and the phrase at least one of include any combination of elements. For example, the phrase one or more of A and B includes A, B, or both A and B. Similarly, the phrase at least one of A and B includes A, B, or both A and B.

Thus, particular implementations have been described. Other implementations are within the scope of the following claims. For example, the actions recited in the claims may be performed in a different order and still achieve desirable results.

What is claimed is:

1. A computer-implemented method comprising:
   receiving, using one or more microphones, an audio signal from a user associated with a user device;
   in response to receiving the audio signal from the user, determining whether an application, from among a plurality of applications in the user device, is configured to provide a text-to-speech response;
   training one or more classifiers using training data to identify one or more likely voice features of the user in the audio signal, the one or more likely voice features of the user including a likely tone of the voice of the user;
   determining, by one or more processors and based on the audio signal received using the one or more microphones, a proximity indicator indicative of a distance between the user and the user device after determining that the application is configured to provide a text-to-speech response;
   obtaining, by the one or more processors, data to be audibly output using a computer-synthesized voice;
   selecting, by the one or more processors, a tone of voice of the computer-synthesized voice that corresponds to the likely tone of voice of the user identified by the training of the one or more classifiers, and a volume level of the computer-synthesized voice based on the likely tone of voice of the user and the distance between the user and the user device indicated by the proximity indicator;
   generating, by the one or more processors, an audio signal based on (i) the data to be audibly output, (ii) the selected tone of voice that corresponds to the likely tone of voice of the user, and (iii) the selected volume level of the computer-synthesized voice; and
   providing, by the one or more processors, the generated audio signal for output by one or more speakers.

2. The method of claim 1, wherein the likely voice features of the user include a likely pitch or frequency of the voice of the user.

3. The method of claim 1, comprising:
   determining environment attributes; and
   determining a type of environment based on the determined environment attributes,
   wherein the tone of voice of the computer-synthesized voice or the volume level of the computer-synthesized voice is selected further based on the determined type of environment.

4. The method of claim 1, wherein the tone of voice of the computer-synthesized voice is selected to match the likely tone of voice of the user and the volume level of the computer-synthesized voice is selected to match a volume of the user and the distance between the user and the user device indicated by the proximity indicator.

5. The method of claim 1, wherein the tone of voice of the computer-synthesized voice or the volume level of the computer-synthesized voice is further selected based on one or more of: (I) a type of the data to be audibly output, and (II) a type of application used to provide the data to be audibly output.

6. The method of claim 1, wherein determining (i) the voice volume of the user associated with the user device, and (ii) the proximity indicator indicative of the distance between the user and the user device comprises:
obtaining audio signal data from a first microphone;
obtaining audio signal data from a second microphone;
obtaining sensor data from one or more sensors, and
determining a likely location and a likely distance of the user based on the sensor data, audio signal data from the first microphone, and the audio signal data from the second microphone.

7. The method of claim 1,
wherein:
the one or more voice features include word enunciation and oratory style of the user; and
the training data includes one or more of a pitch, tone, range of frequency, amplitude values, and voice samples associated with particular voice models.

8. The method of claim 1, further comprising:
receiving a second audio signal;
identifying one or more voice features in the second audio signal;
determining that the identified one or more voice features in the second audio signal do not match one or more voice features associated with the user; and
providing, for output by the one or more speakers, a query message requesting the user to confirm an instruction included in the second audio signal.

9. One or more non-transitory computer-readable storage media comprising instructions, which, when executed by one or more processors, cause the one or more processors to perform operations comprising:
receiving, using one or more microphones, an audio signal from a user associated with a user device;
in response to receiving the audio signal from the user, determining whether an application, from among a plurality of applications in the user device, is configured to provide a text-to-speech response;
training one or more classifiers using training data to identify one or more likely voice features of the user in the audio signal, the one or more likely voice features of the user including a likely tone of the voice of the user;
determining, by one or more processors and based on the audio signal received using the one or more microphones, a proximity indicator indicative of a distance between the user and the user device after determining that the application is configured to provide a text-to-speech response;
obtaining, by the one or more processors, data to be audibly output using a computer-synthesized voice;
selecting, by the one or more processors, a tone of voice of the computer-synthesized voice that corresponds to the likely tone of voice of the user identified by the training of the one or more classifiers, and a volume level of the computer-synthesized voice based on the likely tone of voice of the user and the distance between the user and the user device indicated by the proximity indicator;
generating, by the one or more processors, an audio signal based on (i) the data to be audibly output, (ii) the selected tone of voice that corresponds to the likely tone of voice of the user, and (iii) the selected volume level of the computer-synthesized voice; and
providing, by the one or more processors, the generated audio signal for output by one or more speakers.

10. The media of claim 9, wherein the likely voice features of the user include a likely pitch or frequency of the voice of the user.

11. The media of claim 9, wherein the operations comprise:
determining environment attributes; and
determining a type of environment based on the determined environment attributes,
wherein the tone of voice of the computer-synthesized voice or the volume level of the computer-synthesized voice is selected further based on the determined type of environment.

12. The media of claim 9, wherein the tone of voice of the computer-synthesized voice is selected to match the likely tone of voice of the user and the volume level of the computer-synthesized voice is selected to match a volume of the user and the distance between the user and the user device indicated by the proximity indicator.

13. The media of claim 9, wherein the tone of voice of the computer-synthesized voice or the volume level of the computer-synthesized voice is further selected based on one or more of: (I) a type of the data to be audibly output, and (II) a type of application used to provide the data to be audibly output.

14. The media of claim 9, wherein determining (i) the voice volume of the user associated with the user device, and (ii) the proximity indicator indicative of the distance between the user and the user device comprises:
obtaining audio signal data from a first microphone;
obtaining audio signal data from a second microphone;
obtaining sensor data from one or more sensors; and
determining a likely location and a likely distance of the user based on the sensor data, audio signal data from the first microphone, and the audio signal data from the second microphone.

15. A system comprising:
one or more processors and one or more storage devices storing instructions which when executed by the one or more processors, cause the one or more processors to perform operations comprising:
receiving, using one or more microphones, an audio signal from a user associated with a user device;
in response to receiving the audio signal from the user, determining whether an application, from among a plurality of applications in the user device, is configured to provide a text-to-speech response;
training one or more classifiers using training data to identify one or more likely voice features of the user in the audio signal, the one or more likely voice features of the user including a likely tone of the voice of the user;
determining, based on the audio signal received using the one or more microphones, a proximity indicator indicative of a distance between the user and the user device, after determining that the application is configured to provide a text-to-speech response;
obtaining data to be audibly output using a computer-synthesized voice;
selecting a tone of voice of the computer-synthesized voice that corresponds to the likely tone of voice of the user identified by the training of the one or more classifiers, and a volume level of the computer-synthesized voice based on the likely tone of voice of the user and the distance between the user and the user device indicated by the proximity indicator;

generating an audio signal based on (i) the data to be audibly output, (ii) the selected tone of voice that corresponds to the likely tone of voice of the user, and (iii) the selected volume level of the computer-synthesized voice; and providing the generated audio signal for output by one or more speakers.

16. The system of claim 15, wherein the likely voice features of the user include a likely pitch or frequency of the voice of the user.

17. The system of claim 15, wherein the tone of voice of the computer-synthesized voice or the volume level of the computer-synthesized voice is selected based on one or more of: (I) a type of the data to be output, and (II) a type of application used to provide the data to be audibly output.

18. The system of claim 15, wherein determining (i) the voice volume of the user associated with the user device, and (ii) the proximity indicator indicative of the distance between the user and the user device comprises:

obtaining audio signal data from a first microphone;
obtaining audio signal data from a second microphone;
obtaining sensor data from one or more sensors; and
determining a likely location and a likely distance of the user based on the sensor data, audio signal data from the first microphone, and the audio signal data from the second microphone.

* * * * *